(12) United States Patent
Yoshitomi et al.

(10) Patent No.: US 8,221,929 B2
(45) Date of Patent: Jul. 17, 2012

(54) FUEL CELL STACK

(75) Inventors: Ryoichi Yoshitomi, Utsunomiya (JP);
Ken Takahashi, Shimotsuga-gun (JP);
Go Morimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 471 days.

(21) Appl. No.: 12/472,821

(22) Filed: May 27, 2009

(65) Prior Publication Data

US 2009/0297920 A1 Dec. 3, 2009

(30) Foreign Application Priority Data

May 27, 2008 (JP) .................................. 2008-138234

(51) Int. Cl.
*H01M 8/02* (2006.01)
*H01M 2/08* (2006.01)
(52) U.S. Cl. .................. 429/446; 429/403; 429/460
(58) Field of Classification Search .................. 429/403, 429/446, 460
See application file for complete search history.

(56) References Cited

U.S. PATENT DOCUMENTS

| | | | | |
|---|---|---|---|---|
| 7,641,999 | B2* | 1/2010 | Ishizuka et al. | 429/467 |
| 7,709,132 | B2* | 5/2010 | Ishizuka et al. | 429/470 |
| 7,736,816 | B2* | 6/2010 | Yoshitomi et al. | 429/463 |

FOREIGN PATENT DOCUMENTS

| | | |
|---|---|---|
| JP | 2000-12050 | 1/2000 |
| JP | 2003-203670 | 7/2003 |
| JP | 2006-221846 | 8/2006 |

OTHER PUBLICATIONS

Chinese Office Action for Application No. 200910137122.4, dated May 4, 2011.

* cited by examiner

*Primary Examiner* — Lyle Alexander
(74) *Attorney, Agent, or Firm* — Nelson Mullins Riley & Scarborough LLP; Anthony A. Laurentano

(57) ABSTRACT

A fuel cell stack includes a stack body formed by stacking a plurality of unit cells, and a casing including end plates. Components of the stack body are held together in the casing. Side plates and angle members of the casing form an outer profile line, and the end plates are positioned inside the outer profile line. Corners of insulating plates protrude outwardly beyond corners of the end plates, and are positioned inside the inner wall surfaces of the corners of the casing.

5 Claims, 8 Drawing Sheets

FUEL CELL STACK

BACKGROUND OF THE INVENTION

1. Field of the Invention

The present invention relates to a fuel cell stack including a stack body formed by stacking electrolyte electrode assemblies and separators, and a box-shaped casing containing the stack body. Each of the electrolyte electrode assemblies includes a pair of electrodes and an electrolyte interposed between the electrodes.

2. Description of the Related Art

For example, a solid polymer electrolyte fuel cell employs an electrolyte membrane (electrolyte) comprising a polymer ion exchange membrane. The electrolyte membrane is interposed between an anode and a cathode to form a membrane electrode assembly. The membrane electrode assembly is sandwiched between separators to form a fuel cell.

In use, normally, a predetermined number of (e.g., several tens to several hundreds of) fuel cells are stacked together to form a fuel cell stack to obtain a desired electrical energy. In the fuel cell stack, in order to prevent the increase of the internal resistance in the fuel cells, and degradation of performance due to leakage of reactant gases, it is necessary to reliably apply pressure to each of the stacked fuel cells and hold the stacked fuel cells.

In this regard, for example, a fuel cell disclosed in Japanese Laid-Open Patent Publication No. 2003-203670 is known. As shown in FIG. 8, the fuel cell includes a stack body 3 formed by stacking unit cells 2. Each of the unit cells 2 includes an electrolyte membrane and electrodes sandwiching the electrolyte membrane. End plates 4, 5 are provided at opposite ends of the stack body 3 in the stacking direction. Belleville springs 6 are provided between the end plate 5 and the stack body 3.

On each side surface of the stack body 3 along the stacking direction, a metal tension plate 7 is provided for applying a surface pressure to the stack body 3, and maintaining the surface pressure.

In particular, in the case where the fuel cell is mounted in a vehicle, a load from the outside tends to be applied to the fuel cells. In this case, when a compression load is applied to the fuel cell in the stacking direction of the unit cells 2, the tension plates 7 having low strength in comparison with the end plates 4, 5 tend to be deformed (buckled) easily. Thus, the tension plates 7 are deformed inwardly toward the stack body 3 or deformed outwardly in a direction away from the stack body 3. Therefore, the unit cells 2 and the harness and the other peripheral components outside the unit cells 2 may be damaged undesirably.

SUMMARY OF THE INVENTION

The present invention has been made to solve the problem of this type, and an object of the present invention is to provide a fuel cell stack having simple structure in which when an external force is applied to the fuel cell stack in the stacking direction of the fuel cell stack, deformation due to buckling of the casing can be suppressed suitably.

The present invention relates to a fuel cell stack including a stack body formed by stacking a plurality of electrolyte electrode assemblies and separators in a stacking direction, and a box-shaped casing containing the stack body. Each of the electrolyte electrode assemblies includes a pair of electrodes, and an electrolyte interposed between the electrodes.

The casing includes end plates provided at opposite ends of the stack body in the stacking direction, a plurality of side plates provided on sides of the stack body, and coupling members for coupling the end plates and the side plates. At least the end plates are positioned within an outer profile line formed by the side plates.

In the present invention, the end plates are positioned inside the outer profile line formed by the side plates. Therefore, when a load (compression force) is applied to the fuel cell stack in the stacking direction, the side plates can move in the stacking direction relative to the end plates such that the side plates accommodate the end plates. Thus, the load applied to the fuel cell stack in the stacking direction is suitably absorbed. Accordingly, in particular, deformation of the fuel cell stack due to buckling of the side plates is suppressed, and structure of the fuel cell stack is simplified advantageously.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
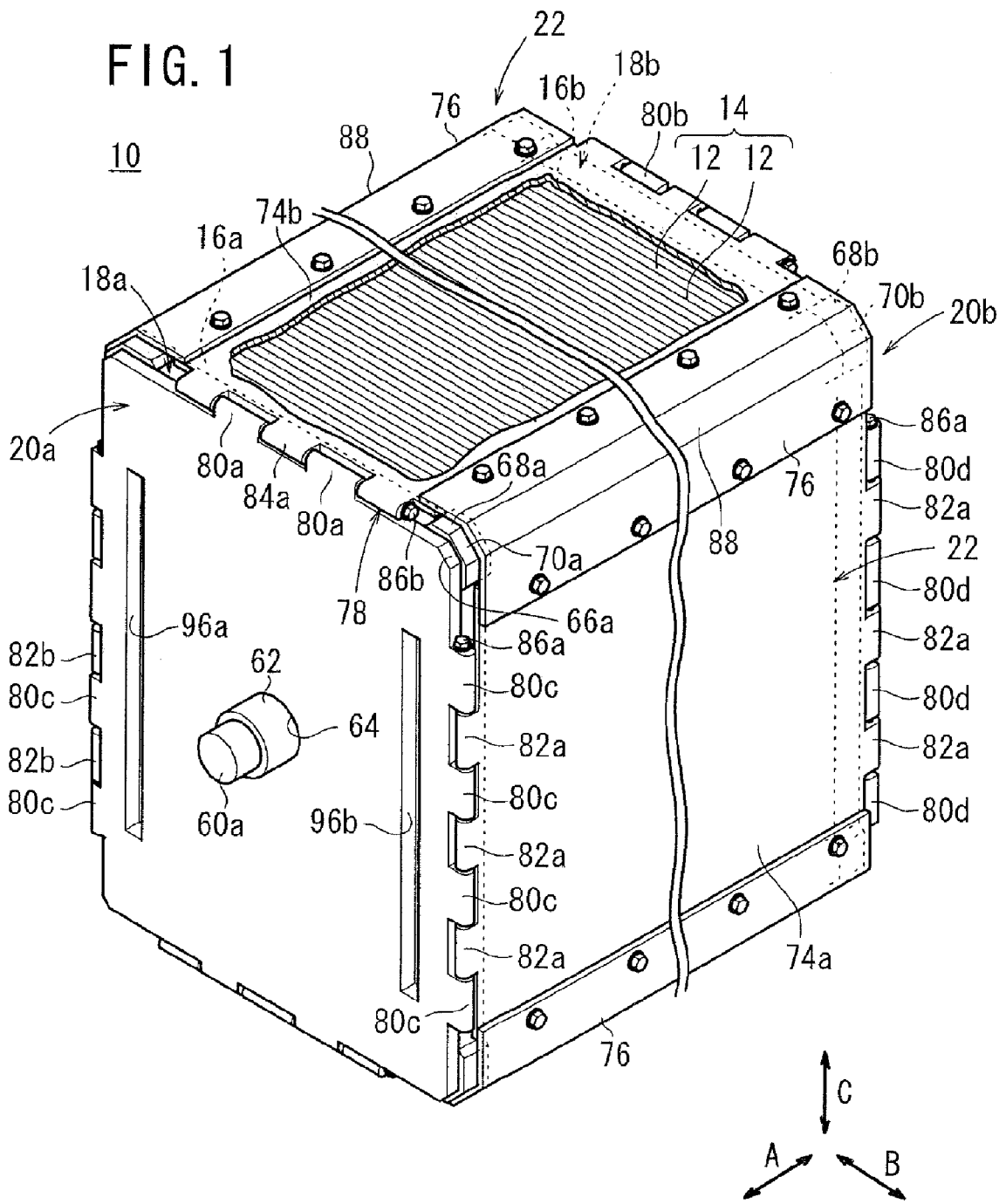
FIG. 1 is a perspective view partially in cross section schematically showing a fuel cell stack according to a first embodiment of the present invention.
Figure 2:
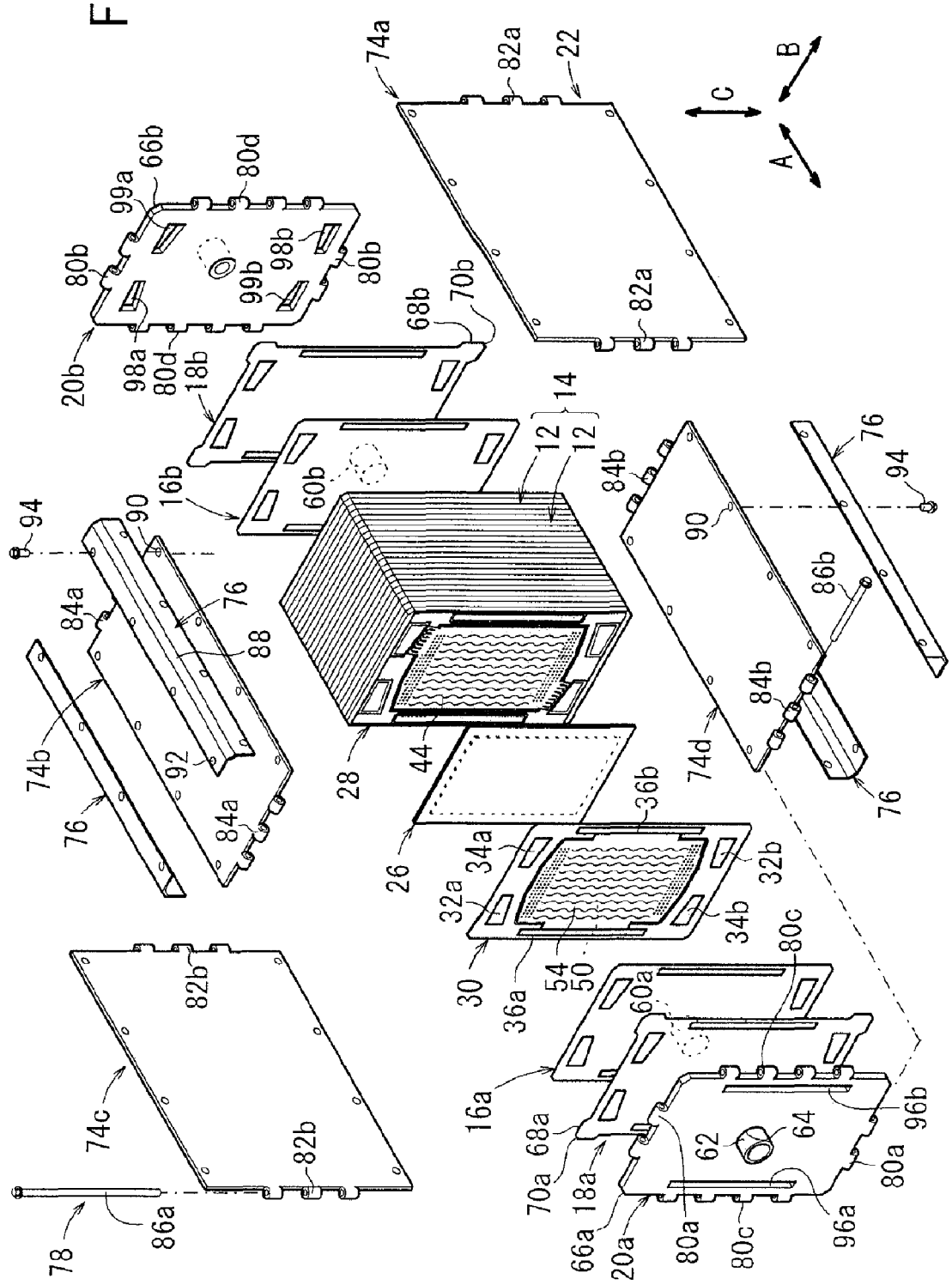
FIG. 2 is a partial exploded perspective view showing the fuel cell stack.

A fuel cell stack 10 is preferably used as a fuel cell stack mounted in a vehicle. As shown in FIGS. 1 and 2, the fuel cell stack 10 includes a stack body 14 formed by stacking a plurality of unit cells 12 in a horizontal direction indicated by an Arrow A.

At one end of the stack body 14 in the stacking direction indicated by the arrow A, a terminal plate 16a is provided. An insulating plate (insulator) 18a is provided outside the terminal plate 16a, and an end plate 20a is provided outside the insulating plate 18a. At the other end of the stack body 14 in the stacking direction, a terminal plate 16b is provided. An insulating plate (insulator) 18b is provided outside the terminal plate 16b, and an end plate 20b is provided outside the insulating plate 18b. The components of the fuel cell stack 10 are held together in a casing 22 including the rectangular end plates 20a, 20b.

Figure 3:
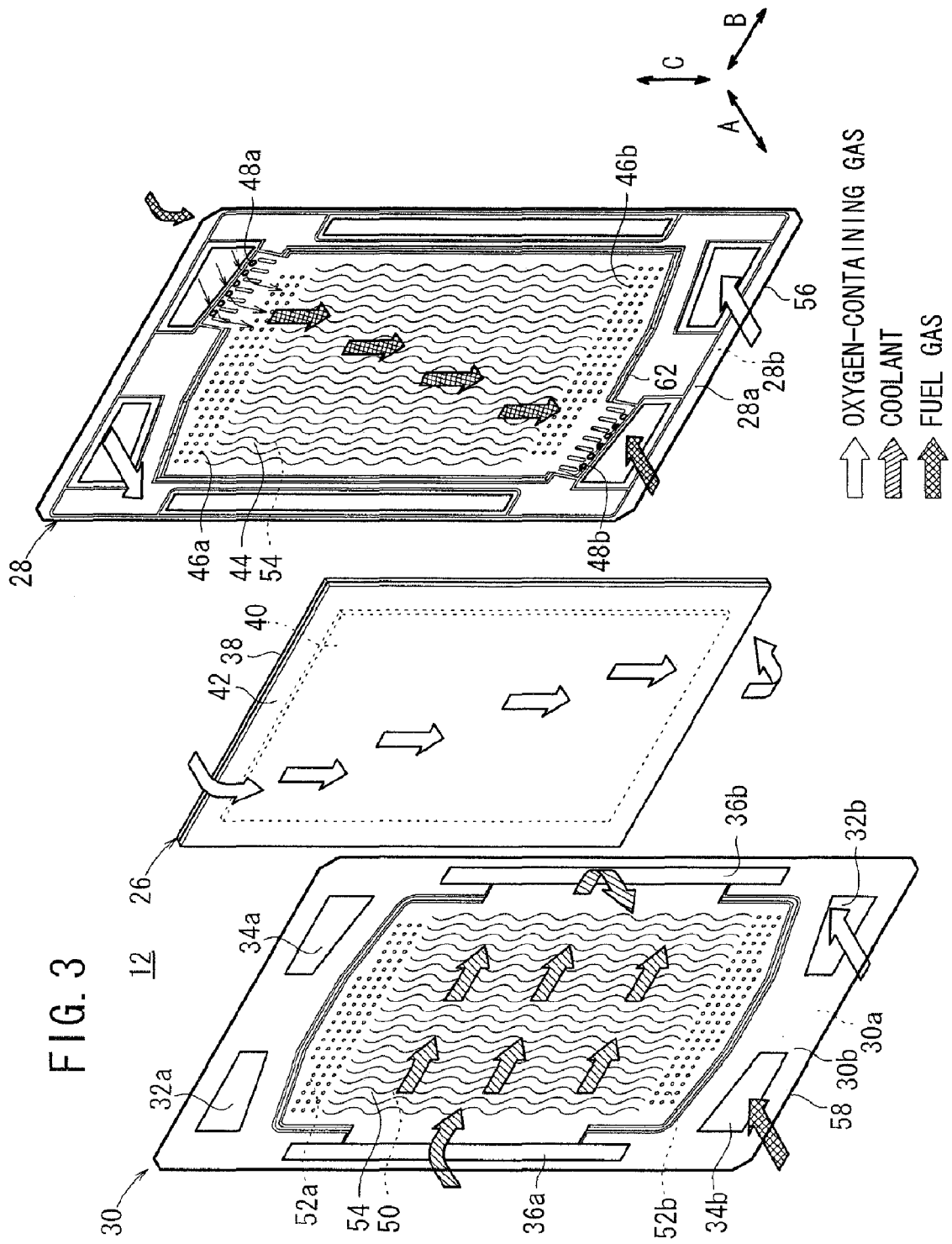
FIG. 3 is an exploded perspective view showing a unit cell of the fuel cell stack.

As shown in FIG. 3, each of the unit cells 12 is formed by sandwiching a membrane electrode assembly (electrolyte electrode assembly) 26 between a first metal separator 28 on the anode side, and a second metal separator 30 on the cathode side. The first metal separator 28 and the second metal separator 30 are formed by pressing metal thin plates into corrugated plates to have grooves and ridges in cross section. Four corners of the first and second metal separators 28, 30 are cut away.

The first metal separator 28 and the second metal separator 30 are, for example, steel plates, stainless steel plates, aluminum plates, plated steel sheets, or metal plates having anti-corrosive surfaces by surface treatment. Instead of the first and second metal separators 28, 30, for example, carbon separators may be used.

At an upper end of the unit cell 12 in a longitudinal direction indicated by an arrow C in FIG. 3, an oxygen-containing gas supply passage 32*a* for supplying an oxygen-containing gas and a fuel gas supply passage 34*a* for supplying a fuel gas such as a hydrogen-containing gas are provided. The oxygen-containing gas supply passage 32*a* and the fuel gas supply passage 34*a* extend through the unit cell 12 in the direction indicated by the arrow A.

At a lower end of the unit cell 12 in the longitudinal direction, a fuel gas discharge passage 34*b* for discharging the fuel gas and an oxygen-containing gas discharge passage 32*b* for discharging the oxygen-containing gas are provided. The fuel gas discharge passage 34*b* and the oxygen-containing gas discharge passage 32*b* extend through the unit cell 12 in the direction indicated by the arrow A.

At one end of the unit cell 12 in a lateral direction indicated by an arrow B, a coolant supply passage 36*a* for supplying a coolant is provided. At the other end of the unit cell 12 in the lateral direction, a coolant discharge passage 36*b* for discharging the coolant is provided. The coolant supply passage 36*a* and the coolant discharge passage 36*b* extend through the unit cell 12 in the direction indicated by the arrow A.

The membrane electrode assembly 26 includes an anode 40, a cathode 42, and a solid polymer electrolyte membrane 38 interposed between the anode 40 and the cathode 42. The solid polymer electrolyte membrane 38 is formed by impregnating a thin membrane of perfluorosulfonic acid with water, for example. The surface area of the anode 40 is smaller than the surface area of the cathode 42.

Each of the anode 40 and the cathode 42 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 40 and the electrode catalyst layer of the cathode 42 are formed on both surfaces of the solid polymer electrolyte membrane 38, respectively.

The first metal separator 28 has a fuel gas flow field 44 on its surface 28*a* facing the membrane electrode assembly 26. The fuel gas flow field 44 is connected between the fuel gas supply passage 34*a* and the fuel gas discharge passage 34*b*. The fuel gas flow field 44 comprises a plurality of corrugated grooves extending in the direction indicated by the arrow C. An inlet buffer 46*a* is provided at an upper end of the fuel gas flow field 44, and an outlet buffer 46*b* is provided at a lower end of the fuel gas flow field 44.

A plurality of supply holes 48*a* and a plurality of discharge holes 48*b* are formed on the surface 28*a* of the first metal separator 28. The supply holes 48*a* connect the fuel gas supply passage 34*a* and the inlet buffer 46*a*, and the discharge holes 48*b* connect the fuel gas discharge passage 34*b* and the outlet buffer 46*b*.

The second metal separator 30 has an oxygen-containing gas flow field 50 on its surface 30*a* facing the membrane electrode assembly 26. The oxygen-containing gas flow field 50 is connected between the oxygen-containing gas supply passage 32*a* and the oxygen-containing gas discharge passage 32*b*. The oxygen-containing gas flow field 50 comprises a plurality of corrugated grooves extending in the direction indicated by the arrow C. An inlet buffer 52*a* is provided at an upper end of the oxygen-containing gas flow field 50, and an outlet buffer 52*b* is provided at a lower end of the oxygen-containing gas flow field 50.

A coolant flow field 54 communicating with the coolant supply passage 36*a* and the coolant discharge passage 36*b* is formed between a surface 30*b* of the second metal separator 30 and a surface 28*b* of the first metal separator 28. That is, the coolant flow field 54 is formed by overlapping the back surface of the fuel gas flow field 44 and the back surface of the oxygen-containing gas flow field 50. The coolant flow field 54 extends in the direction indicated by the arrow B.

A first seal member 56 is formed integrally on the surfaces 28*a*, 28*b* of the first metal separator 28, around the outer end of the first metal separator 28. A second seal member 58 is formed integrally on the surfaces 30*a*, 30*b* of the second metal separator 30, around the outer end of the second metal separator 30. For example, the first and second seal members 56, 58 are made of seal material, cushion material or packing material such as EPDM (Ethylene Propylene Diene Monomer), NBR (Nitrile Butadiene Rubber), fluoro rubber, silicone rubber, fluoro silicone rubber, butyl rubber (Isobutene-Isoprene Rubber), natural rubber, styrene rubber, chloroprene rubber, or acrylic rubber.

As shown in FIG. 2, a first current collecting terminal 60*a* extends outwardly in the stacking direction, at a position spaced upwardly by a predetermined distance from the center in the surface of the terminal plate 16*a*. The first current collecting terminal 60*a* is inserted into an insulating cylindrical portion 62, and in this state, the first current collecting terminal 60*a* passes through the insulating plate 18*a* and a hole 64 of the end plate 20*a*, and protrudes outwardly (see FIG. 1). Likewise, a second current collecting terminal 60*b* extends outwardly in the stacking direction, at a position spaced upwardly by a predetermined distance from the center in the surface of the terminal plate 16*b* (see FIG. 2).

Each of the end plates 20*a*, 20*b* has four cutaways 66*a*, 66*b* at its four corners, and corners 68*a*, 68*b* of the insulating plates 18*a*, 18*b* protrude outwardly beyond corners of the end plates 20*a*, 20*b*. The corners 68*a*, 68*b* have cutaways 70*a*, 70*b*.

As shown in FIGS. 1 and 2, the casing 22 includes the end plates 20*a*, 20*b*, a plurality of side plates 74*a* to 74*d* provided on sides of the stack body 14, angle members 76 for coupling adjacent ends of the side plates 74*a* to 74*d*, and a hinge mechanism 78 for coupling the end plates 20*a*, 20*b* and the side plates 74*a* to 74*d*. The side plates 74*a* to 74*d* are thin metal plates.

The hinge mechanism 78 includes two first hinges 80*a*, 80*b* provided at each of upper and lower sides of the end plates 20*a*, 20*b*, and four first hinges 80*c*, 80*d* provided at each of left and right sides of the end plates 20*a*, 20*b*.

As shown in FIG. 2, the hinge mechanism 78 further includes three second hinges 82*a*, 82*b* provided at each of longitudinal ends (in the direction indicated by the arrow A) of the side plates 74*a*, 74*c* provided on both sides of the stack body 14 in the direction indicated by the arrow B, and two second hinges 84*a*, 84*b* provided at each of longitudinal ends of the side plates 74*b*, 74*d* on both of upper and lower sides of the stack body 14.

The three second hinges 82*a*, 82*b* of each of the side plates 74*a*, 74*c* and the four first hinges 80*c*, 80*d* of each of both sides of the end plates 20*a*, 20*b* are provided alternately, and long coupling pins (coupling members) 86*a* are inserted into these hinges to couple the side plates 74*a*, 74*c* to the end plates 20*a*, 20*b* together.

Likewise, the three second hinges 84a, 84b of each of the side plates 74a, 74b and the two first hinges 80a, 80b on each of the upper and lower sides of the end plates 20a, 20b are provided alternately, and the short coupling pins (coupling members) 86b are inserted into these hinges to couple the side plates 74b, 74d and the end plates 20a, 20b together.

Each of the angle members 76 has a corner 88 having a cutaway shape corresponding to the shape of the unit cell 12. As shown in FIG. 2, the side plates 74a to 74d have a plurality of screw holes 90 at both of the lateral ends, respectively. Holes 92 corresponding to the screw holes 90 are formed in the respective sides of the angle members 76. Screws 94 inserted into the holes 92 are screwed into the screw holes 90 to fix the side plates 74a to 74d together through the angle members 76. In this manner, the casing 22 is fabricated (see FIG. 1).

The side plates 74a to 74d and the angle members 76 of the casing 22 form an outer profile line, and the end plates 20a, 20b are positioned inside the outer profile line. In the insulating plates 18a, 18b, the corners 68a, 68b protrude outwardly beyond the corners of the end plates 20a, 20b, and are positioned inside the inner wall surface of the corners of the casing 22 (inner wall surface of the angle members 76).

As shown in FIGS. 1 and 2, a coolant inlet manifold 96a and a coolant outlet manifold 96b extending in the direction indicated by the arrow C are provided at the end plate 20a. The coolant inlet manifold 96a is connected to the coolant supply passage 36a, and the coolant outlet manifold 96b is connected to the coolant discharge passage 36b.

As shown in FIG. 2, an oxygen-containing gas inlet manifold 98a and a fuel gas inlet manifold 99a are provided at upper positions of the end plate 20b. The oxygen-containing gas inlet manifold 98a is connected to the oxygen-containing gas supply passage 32a, and the fuel gas inlet manifold 99a is connected to the fuel gas supply passage 34a. An oxygen-containing gas outlet manifold 98b and a fuel gas outlet manifold 99b are provided at lower positions of the end plate 20b. The oxygen-containing gas outlet manifold 98b is connected to the oxygen-containing gas discharge passage 32b, and the fuel gas outlet manifold 99b is connected to the fuel gas discharge passage 34b.

Next, operation of the fuel cell stack 10 will be described below.

In the fuel cell stack 10, firstly, an oxygen-containing gas is supplied from the oxygen-containing gas inlet manifold 98a of the end plate 20b to the oxygen-containing gas supply passage 32a, and a fuel gas such as a hydrogen-containing gas is supplied from the fuel gas inlet manifold 99a to the fuel gas supply passage 34a. Further, a coolant such as pure water or ethylene glycol is supplied from the coolant inlet manifold 96a at the end plate 20a to the coolant supply passage 36a.

Thus, in the stack body 14, the oxygen-containing gas, the fuel gas, and the coolant are supplied to the unit cells 12 stacked together in the direction indicated by the arrow A.

As shown in FIG. 3, the oxygen-containing gas flows from the oxygen-containing gas supply passage 32a to the oxygen-containing gas flow field 50 of the second metal separator 30, and flows along the cathode 42 of the membrane electrode assembly 26. The fuel gas flows from the fuel gas supply passage 34a to the fuel gas flow field 44 through the supply holes 48a of the first metal separator 28, and flows along the anode 40 of the membrane electrode assembly 26.

Thus, in each of the membrane electrode assemblies 26, the oxygen-containing gas supplied to the cathode 42, and the fuel gas supplied to the anode 40 are consumed in the electrochemical reactions at catalyst layers of the cathode 42 and the anode 40 for generating electricity.

Then, the oxygen-containing gas consumed at the cathode 42 flows along the oxygen-containing gas discharge passage 32b, and is discharged to the outside from the oxygen-containing gas outlet manifold 98b at the end plate 20b. Likewise, the fuel gas consumed at the anode 40 flows through the discharge holes 48b, and flows along the fuel gas discharge passage 34b. Then, the fuel gas is discharged to the outside from the fuel gas outlet manifold 99b at the end plate 20b.

The coolant flows from the coolant supply passage 36a into the coolant flow field 54 between the first and second metal separators 28, 30, and flows in the direction indicated by the arrow B. After the coolant cools the membrane electrode assembly 26, the coolant flows along the coolant discharge passage 36b, and is discharged from the coolant outlet manifold 96b of the end plate 20a.

In the first embodiment, the side plates 74a to 74d and the angle members 76 of the casing 22 form the outer profile line, and the end plates 20a, 20b are positioned inside the outer profile line. Thus, for example, in the case where the fuel cell stack 10 is mounted in a vehicle, when a load is applied to the fuel cell stack 10 in the stacking direction indicated by the arrow A, the side plates 74a to 74d and the angle members 76 can move in the stacking direction relative to the end plates 20a, 20b such that the side plates 74a to 74d and the angle members 76 accommodate the end plates 20a, 20b.

Thus, the load applied to the fuel cell stack 10 in the stacking direction is absorbed effectively. In particular, deformation of the fuel cell stack 10 due to buckling of the side plates 74a to 74d and the angle members 76 is absorbed and minimized suitably, and structure of the fuel cell stack 10 is simplified advantageously. Accordingly, the damage of the unit cell 12 due to inward deformation of the side plates 74a to 74d, and damage of harness (not shown) and peripheral components (not shown) due to outward deformation of the side plates 74a to 74d are prevented effectively.

Figure 4:
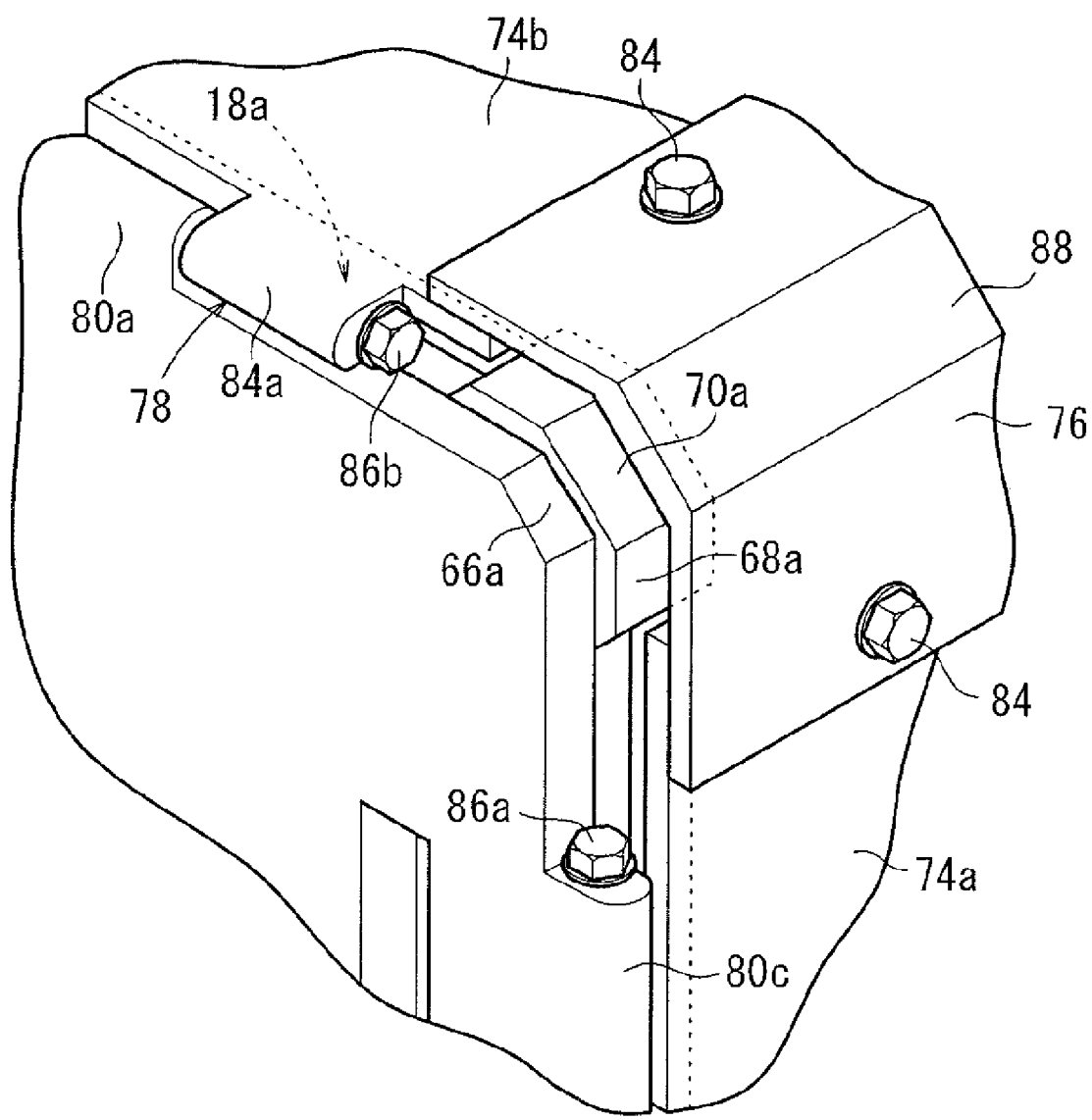
FIG. 4 is an enlarged perspective view showing main components of the fuel cell stack.

Further, as shown in FIG. 4, the corners 68a, 68b of the insulating plates 18a, 18b protrude outwardly beyond the corners of the end plates 20a, 20b, and are positioned inside the inner wall surface of the corners of the casing 22 (inner wall surface of the angle members 76).

Figure 5:
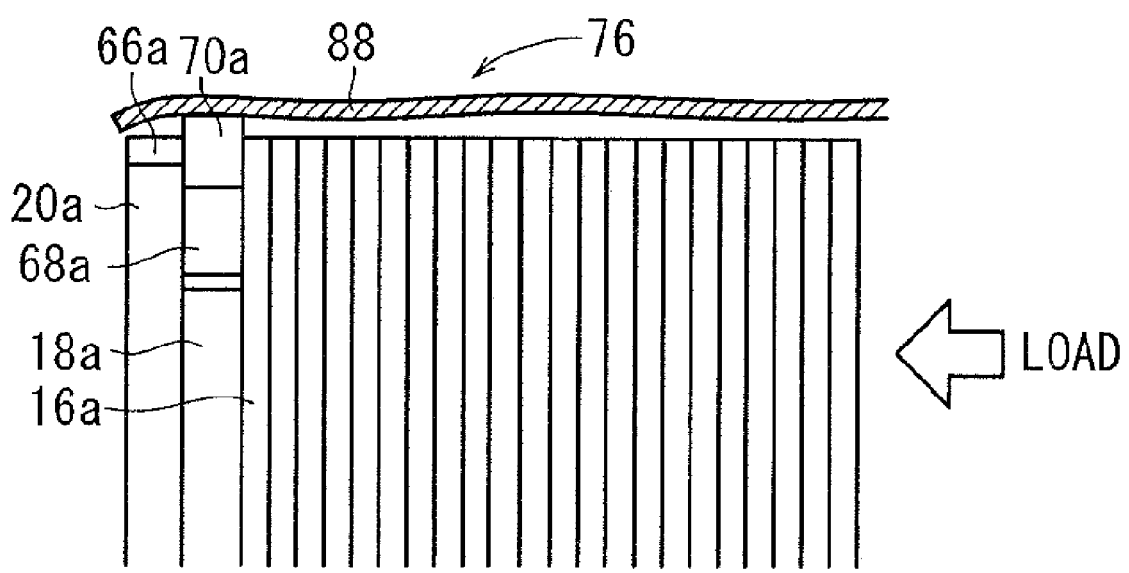
FIG. 5 is a view showing operation of the fuel cell stack.

When the hinge mechanism 78 is rotated by the load in the stacking direction, the side plates 74a to 74d are opened to the outside, and the corner 88 of each of the angle members 76 move inwardly. At this time, the corner 88 can move in the stacking direction by guidance of the corner 68a (68b) of the insulating plate 18a (18b) (see FIG. 5).

Further, corners 68a, 68b of the insulating plates 18a, 18b as members having high strength protrude outwardly beyond the corners of the end plates 20a, 20b. In the structure, the side plates 74a to 74d and the angle members 76 do not contact the end plates 20a, 20b, and are prevented from being deformed toward the unit cell 12 advantageously.

In the first embodiment, as the coupling members for coupling the end plates 20a, 20b and the side plates 74a to 74d, the coupling pins 86a, 86b are adopted. However, the present invention is not limited in this respect. Alternatively, for example, the end plates 20a, 20b and the side plates 74a to 74d may be coupled together by welding, crimping, or using coupling members such as screws or hooks.

Figure 6:
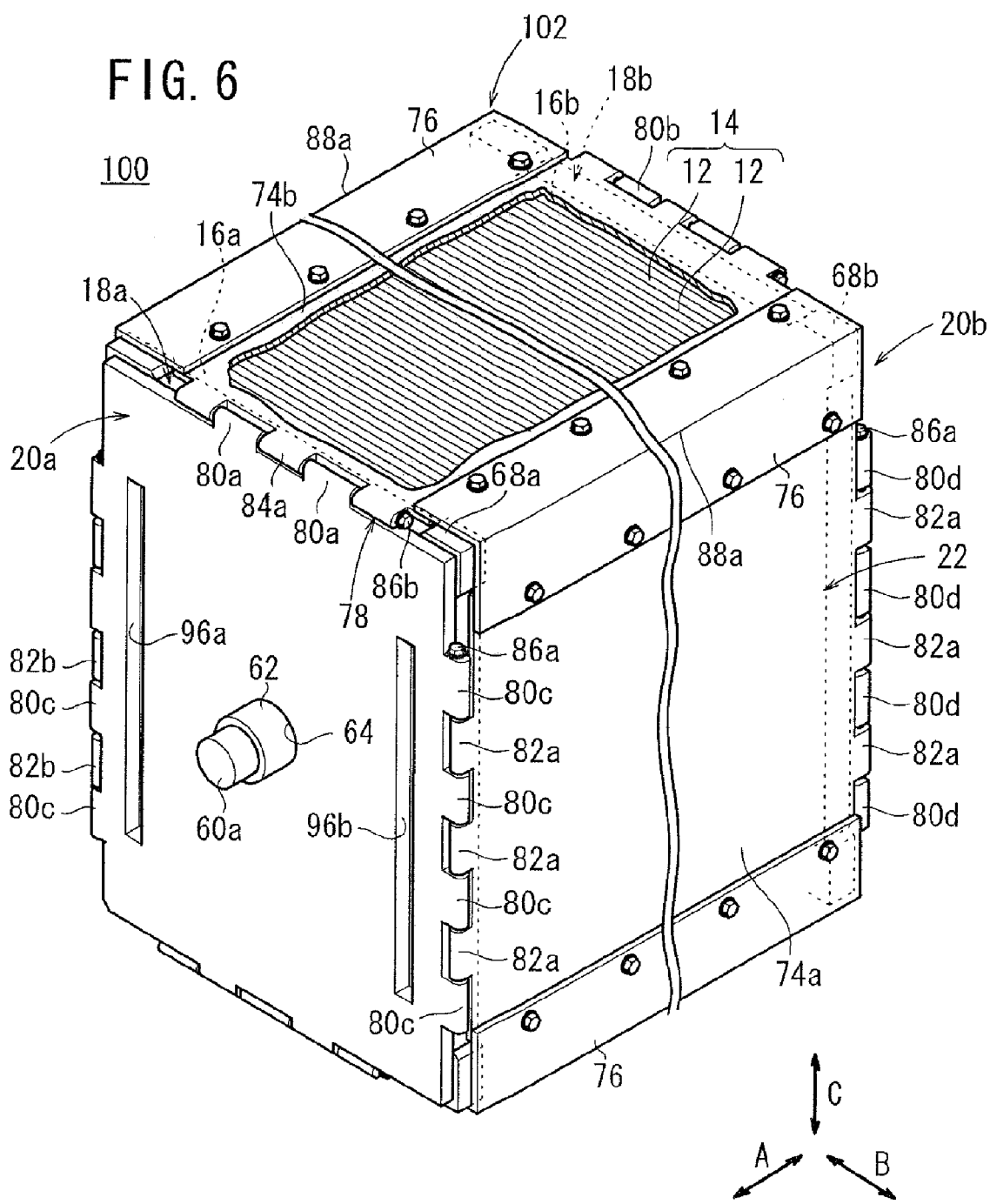
FIG. 6 is a perspective view partially in cross section schematically showing a fuel cell stack according to a second embodiment of the present invention.
Figure 7:
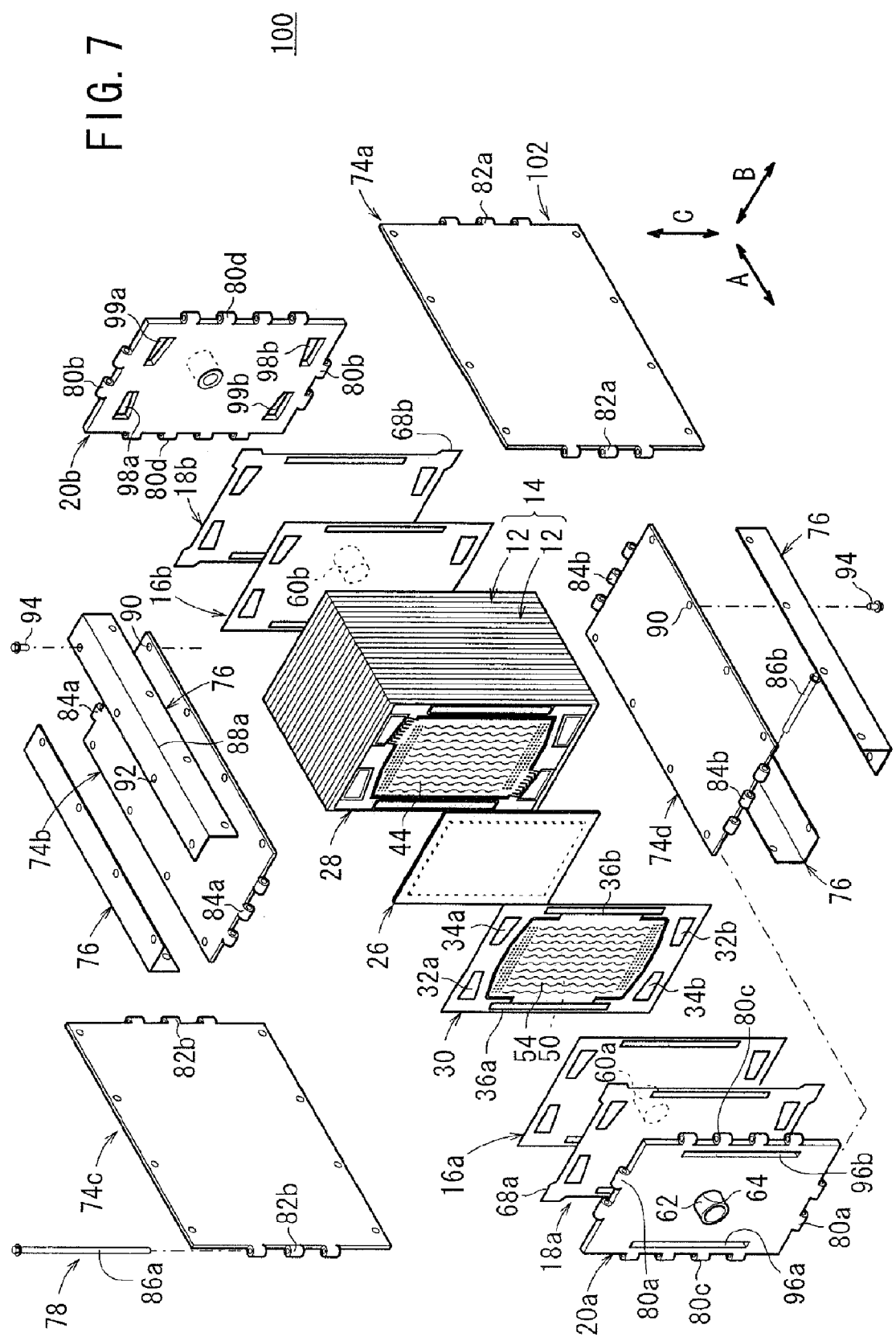
FIG. 7 is a partial exploded perspective view showing the fuel cell stack.
Figure 8:
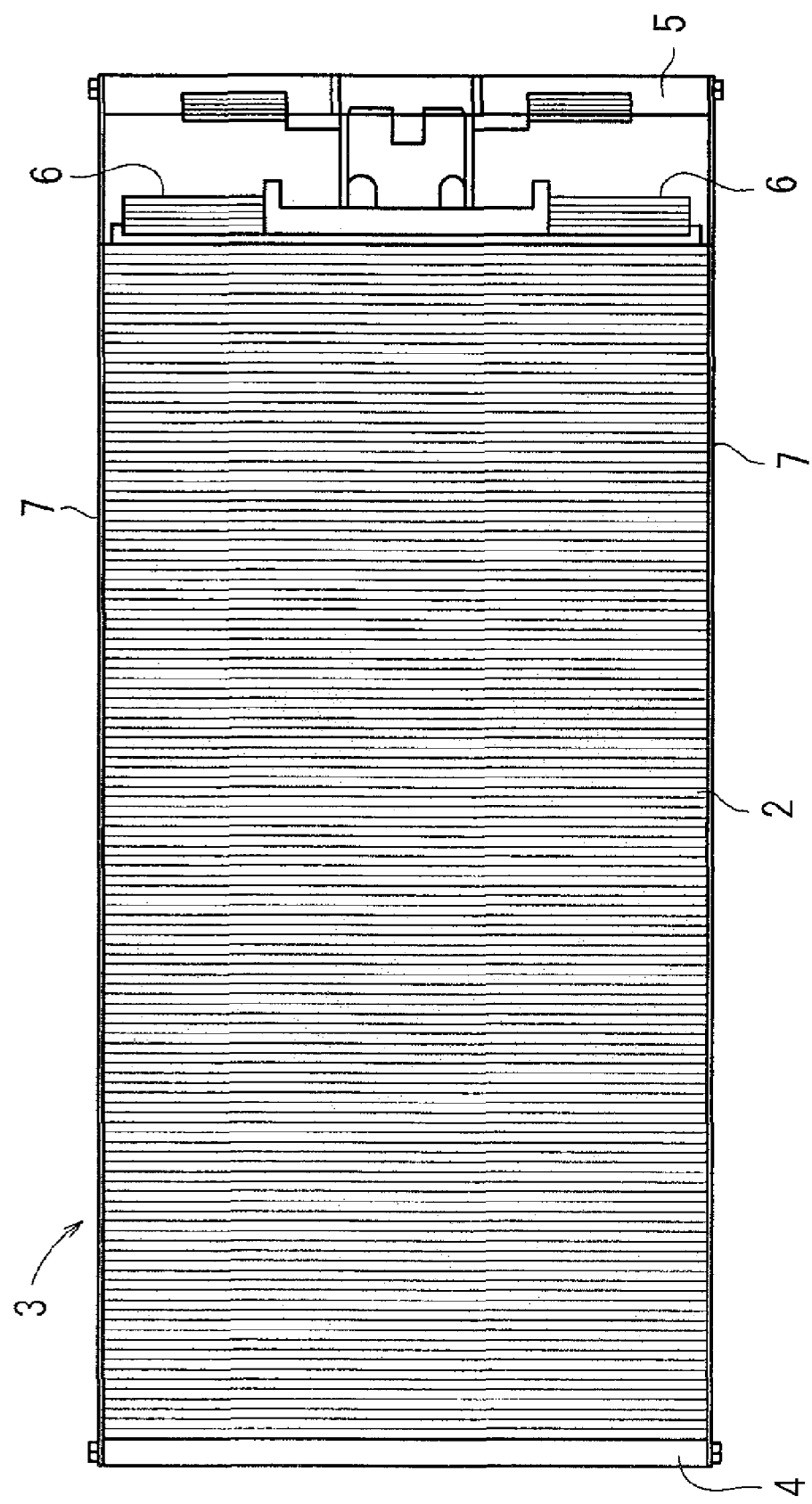
FIG. 8 is a view showing a conventional fuel cell.

FIG. 6 is a partial perspective view partially in cross section showing a fuel cell stack 100 according to a second embodiment of the present invention. The constituent elements that are identical to those of the fuel cell stack 10 according to the first embodiment are labeled with the same reference numeral, and description thereof will be omitted.

In the fuel cell stack 100, no cutaway is present in the four corners of each of the unit cells 12. Further, no cutaway is present in each of corners of the terminal plates 16a, 16b, the insulating plates 18a, 18b, and the end plates 20a, 20b. Though the corners 68a, 68b of the insulating plates 18a, 18b do not have any cutaway, the corners 68a, 68b protrude outwardly beyond the corners of the end plates 20a, 20b as in the case of the first embodiment.

In the casing 102 of the fuel cell stack 100, each angle member 76 has a corner 88a curved at an angle of 90° in correspondence with the shape of the unit cell 12. The corners 68a, 68b of the insulating plates 18a, 18b protrude outwardly beyond the corners of the end plates 20a, 20b, and are positioned inside the inner wall surface of the corners of the casing 102 (inner wall surface of the angle member 76).

In the second embodiment, the end plates 20a, 20b are positioned inside the outer profile line of the casing 102, and the corners 68a, 68b of the insulating plates 18a, 18b protrude outwardly from the corners of the end plates 20a, 20b, and are positioned inside the inner wall surface of the corners of the casing 102. Thus, in the second embodiment, the same advantages as in the case of the first embodiment are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack comprising:
   a stack body formed by stacking a plurality of electrolyte electrode assemblies and separators in a stacking direction, the electrolyte electrode assemblies each including a pair of electrodes, and an electrolyte interposed between the electrodes; and
   a box-shaped casing containing the stack body, the casing comprising:
      end plates provided at opposite ends of the stack body in the stacking direction;
      a plurality of side plates provided on sides of the stack body;
      coupling members for coupling the end plates and the side plates,
   wherein at least the end plates are positioned within an outer profile line formed by the side plates; and
      insulating plates located at each end of the stack body in the stacking direction and located between the stack body and the end plates, the insulating plates including corners that protrude outwardly beyond the corners of the end plates and are positioned within an inner wall surface of the box-shaped casing so as to prevent contact between the plurality of side plates and the end plates.

2. A fuel cell stack according to claim 1, wherein cutaways to corners of the end plates are provided at each corner of the end plates, the cutaways causing the end plates to have an octagonal shape.

3. A fuel cell stack according to claim 2, wherein the end plates and the side plates are fixed together by inserting coupling pins serving as the coupling members into a hinge mechanism, the hinge mechanism being provided at locations where the cutaways are not present.

4. A fuel cell stack according to claim 1, wherein a cutaway is formed at the corner of the insulating plates, the cutaways causing the insulating plates to have an octagonal shape.

5. A fuel cell stack according to claim 1, further comprising an angle member for coupling the side plates together, wherein an inner wall surface of the angle member forms the inner wall surface of the corner of the casing.

* * * * *